(12) United States Patent
Gerszberg et al.

(10) Patent No.: US 6,377,664 B2
(45) Date of Patent: *Apr. 23, 2002

(54) VIDEO PHONE MULTIMEDIA ANNOUNCEMENT ANSWERING MACHINE

(75) Inventors: Irwin Gerszberg, Kendall Park; Jeffrey S. Martin, Dover; Hopeton S. Walker, Haledon, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/001,911

(22) Filed: Dec. 31, 1997

(51) Int. Cl.$^7$ .................. H04M 1/64; H04M 11/00; H04M 1/00; H04N 7/14
(52) U.S. Cl. ............. 379/88.13; 379/67.1; 379/76; 379/93.08; 379/102.03; 379/157; 379/908; 348/14; 348/16; 348/17
(58) Field of Search .............. 379/67.1, 76, 88.13, 379/93.21, 93.25, 102.03, 157, 201, 90.01, 93.01, 93.08, 93.17, 93.19, 265, 268, 900, 908, 102.1; 348/13–17; 340/311.1, 825.44, 825.54

(56) References Cited

U.S. PATENT DOCUMENTS

| 4,456,925 A | | 6/1984 | Skerlos et al. ............... 358/85 |
|---|---|---|---|
| 4,620,289 A | | 10/1986 | Chauvel .................... 364/521 |
| 4,725,694 A | | 2/1988 | Auer et al. .................... 178/18 |
| 4,829,555 A | * | 5/1989 | Hashimoto .................. 379/70 |
| 4,916,441 A | | 4/1990 | Gombrich .................. 340/712 |
| 5,014,267 A | | 5/1991 | Tompkins et al. ............ 370/62 |
| 5,046,079 A | * | 9/1991 | Hashimoto ................... 379/53 |
| 5,157,717 A | | 10/1992 | Hitchcock ................... 379/96 |
| 5,189,691 A | * | 2/1993 | Dunlap ........................ 379/70 |
| 5,220,599 A | * | 6/1993 | Sasano et al. .............. 379/142 |
| 5,276,731 A | * | 1/1994 | Arbel et al. .................. 379/88 |
| 5,283,818 A | | 2/1994 | Klausner et al. ............. 379/67 |
| 5,327,486 A | * | 7/1994 | Wolff et al. .................. 379/96 |
| 5,335,276 A | | 8/1994 | Thompson et al. .......... 380/21 |
| 5,345,258 A | * | 9/1994 | Matsubara et al. .......... 348/14 |
| 5,393,964 A | | 2/1995 | Hamilton et al. ........... 235/381 |
| 5,394,445 A | * | 2/1995 | Ball et al. ..................... 379/67 |
| 5,400,393 A | * | 3/1995 | Knuth et al. .................. 379/88 |
| 5,406,615 A | | 4/1995 | Miller, II et al. ............. 379/59 |
| 5,434,908 A | * | 7/1995 | Klein .......................... 379/88 |
| 5,473,366 A | * | 12/1995 | Imaeda et al. ................ 348/14 |
| 5,479,411 A | * | 12/1995 | Klein ........................ 370/110.1 |
| 5,488,412 A | | 1/1996 | Majeti et al. ................. 348/10 |
| 5,512,935 A | | 4/1996 | Majeti et al. .................. 348/9 |
| 5,534,913 A | | 7/1996 | Majeti et al. .................. 348/7 |
| 5,546,316 A | | 8/1996 | Buckley et al. ......... 364/479.03 |
| 5,550,754 A | * | 8/1996 | McNelley et al. ...... 364/514 A |
| 5,561,604 A | | 10/1996 | Buckley et al. ......... 364/479.05 |
| 5,572,005 A | | 11/1996 | Hamilton et al. ........... 235/381 |

(List continued on next page.)

OTHER PUBLICATIONS

US Patent Application 08/943,312 filed Oct. 14, 1997, entitled Wideband Communication System for the Home, to Robert R. Miller, II and Jesse E. Russell, 21 pages.

US Patent Application 08/858,170 filed May 14, 1997, entitled Wide Band Transmission Through Wire, to Robert R. Miller, II, Jesse E. Russell and Richard R. Shively, 15 pages.

*Primary Examiner*—Allan Hoosain

(57) ABSTRACT

A video enable answering machine having many new features including customized video announcement messages, caller ID based video announcement messages, and time based video announcement messages.

19 Claims, 11 Drawing Sheets

U.S. PATENT DOCUMENTS

| | | | |
|---|---|---|---|
| 5,583,920 A | * 12/1996 | Wheeler, Jr. | 379/88 |
| 5,583,965 A | 12/1996 | Douma et al. | 395/2.84 |
| 5,584,054 A | 12/1996 | Tyneski et al. | 455/89 |
| 5,587,735 A | 12/1996 | Ishida et al. | 348/14 |
| 5,604,791 A | * 2/1997 | Lee | 379/67 |
| 5,619,684 A | 4/1997 | Goodwin et al. | 395/500 |
| 5,644,355 A | * 7/1997 | Koz et al. | 348/17 |
| 5,644,628 A | 7/1997 | Schwarzer et al. | 379/93.19 |
| 5,671,267 A | 9/1997 | August et al. | 379/61 |
| 5,675,375 A | * 10/1997 | Riffee | 348/15 |
| 5,675,507 A | * 10/1997 | Bobo, II | 364/514 R |
| 5,682,195 A | 10/1997 | Hendricks et al. | 348/6 |
| 5,684,918 A | 11/1997 | Abecassis | 386/83 |
| 5,760,823 A | 6/1998 | Brunson et al. | 348/14 |
| 5,764,512 A | * 6/1998 | Michel et al. | 364/400.01 |
| 5,764,901 A | * 6/1998 | Skarbo et al. | 395/200.34 |
| 5,778,053 A | * 7/1998 | Skarbo et al. | 379/93.21 |
| 5,835,130 A | * 11/1998 | Read et al. | 348/16 |
| 5,838,252 A | * 11/1998 | Kikinis | 340/825.44 |
| 5,896,165 A | * 4/1999 | Rao | 348/14 |
| 5,905,524 A | * 5/1999 | Sauer | 348/15 |
| 5,923,736 A | * 7/1999 | Shachar | 379/93.17 |
| 6,020,916 A | * 2/2000 | Gerszberg et al. | 348/15 |

* cited by examiner

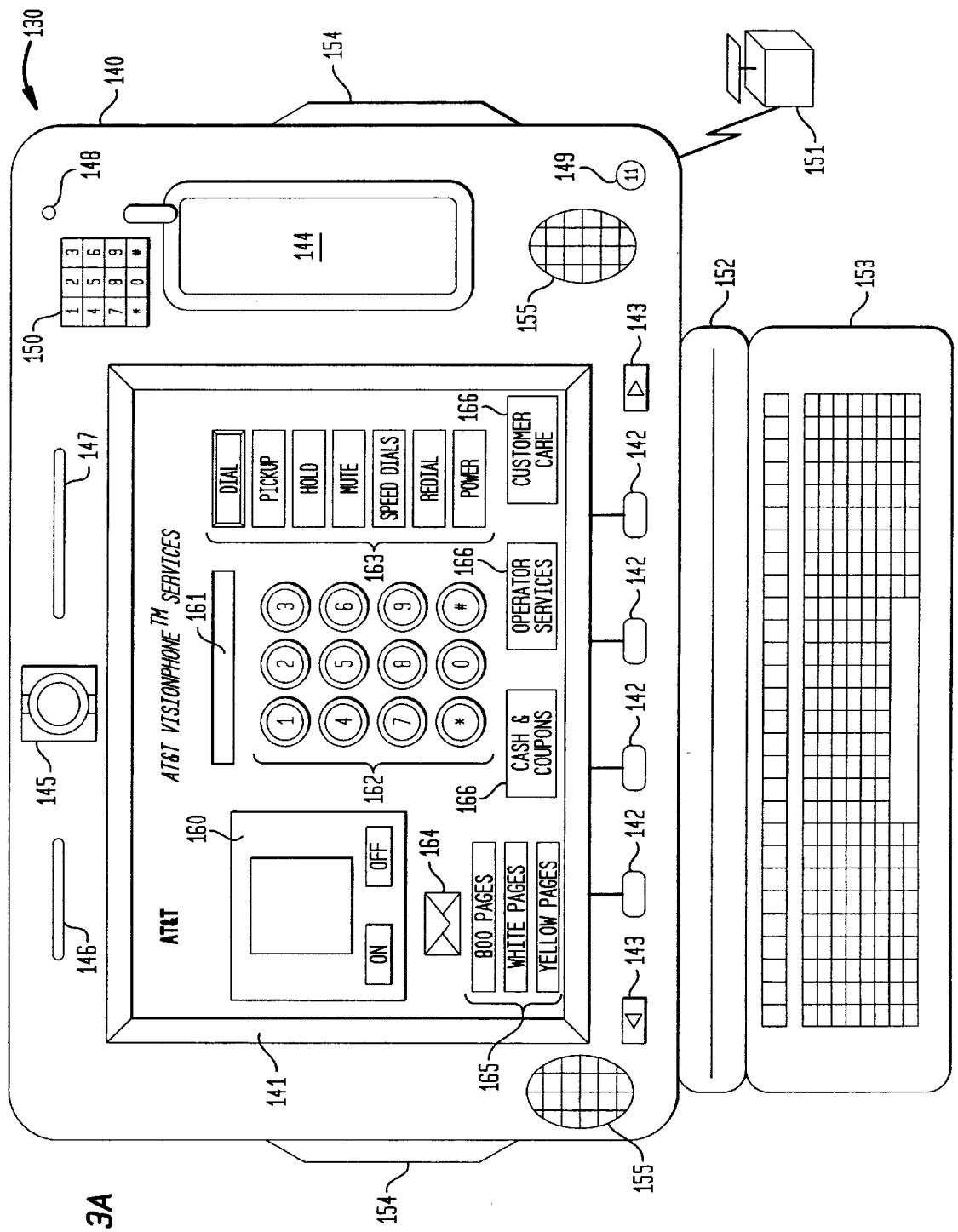

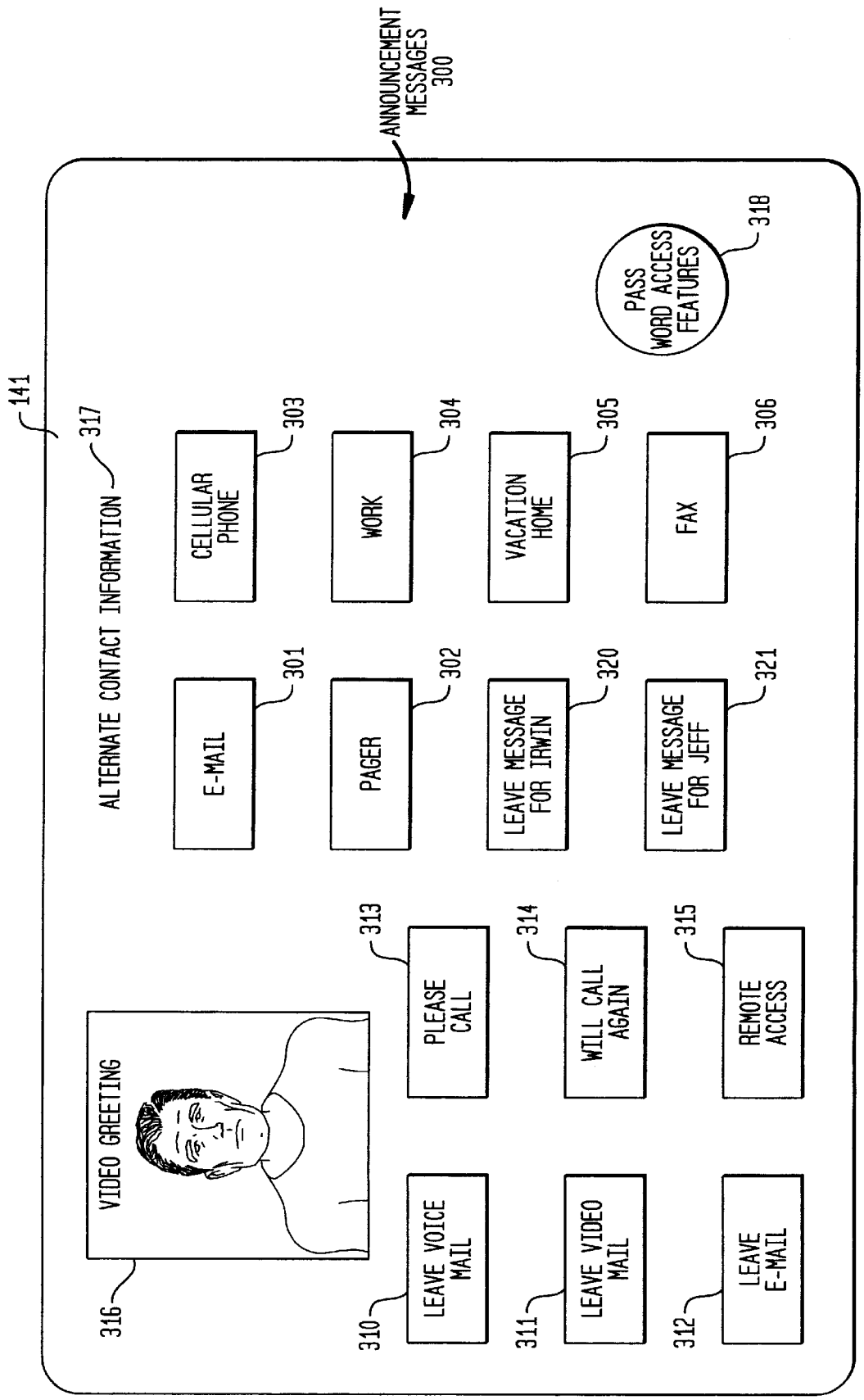

VIDEO PHONE MULTIMEDIA ANNOUNCEMENT ANSWERING MACHINE

FIELD OF THE INVENTION

The invention relates generally to telephone answering machines, and more particularly to a multimedia answering machine.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the type of DSL modem provided by the local telephone company must also be provided to the end user in the customer premises equipment (CPE). Additionally, since the network is not completely controlled by the interexchange companies, it is difficult for the interexchange companies to provide data at committed delivery rates and/or desired quality levels. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services.

A problem that has plagued many telephone users is the endless phone hierarchies where a customer calls a company or government office and becomes mired in an endless array of menu choices—none of which seem to guide the individual to where he or she would like to go. Often the answering machine will simply hang-up on the individual at the end of one menus without ever providing the individual the information requested. Users often become frustrated at not being able to speak with a human being.

Another problem for many users of telephone answering machines is that it is very difficult to customize a telephone answering machine to reflect the personality of the owner of the machine. We customize our business cards, holiday cards, and letter head, employ different advertising, and decorate our offices to reflect our own personalities, to draw attention to ourselves, and to differentiate our services. However, heretofore, it has been difficult to customize our voice announcement messages. Although some users have added music through the use of a tape recorder playing while the user is recording an announcement, these attempts at customizing a voice greeting are crude at best and are cumbersome to use.

As a further problem, users which are placed on-hold are either provided comfort noise, music, and/or advertisements from the company to which they called. Time on hold often passes very slowly and many users may hang-up. Home users without sophisticated PABX machines are even more disadvantages since these users usually only provide comfort noise to their customers which are place on-hold.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed at or near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, one aspect of the invention provides a mutlimedia announcement answering machine. The users may record video greetings for their answering machine. The video greetings may include animations and other suitable audio/video clips. Still images may also be presented.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 3A and 3B illustrate an embodiment of a video phone consistent with the architecture shown in FIG. 1.

FIGS. 5–8 illustrate various multimedia announcement functions that may be generated by the video phone upon receiving a call.

DETAILED DESCRIPTION OF PREFERRED EMBODIMENTS

Figure 1:
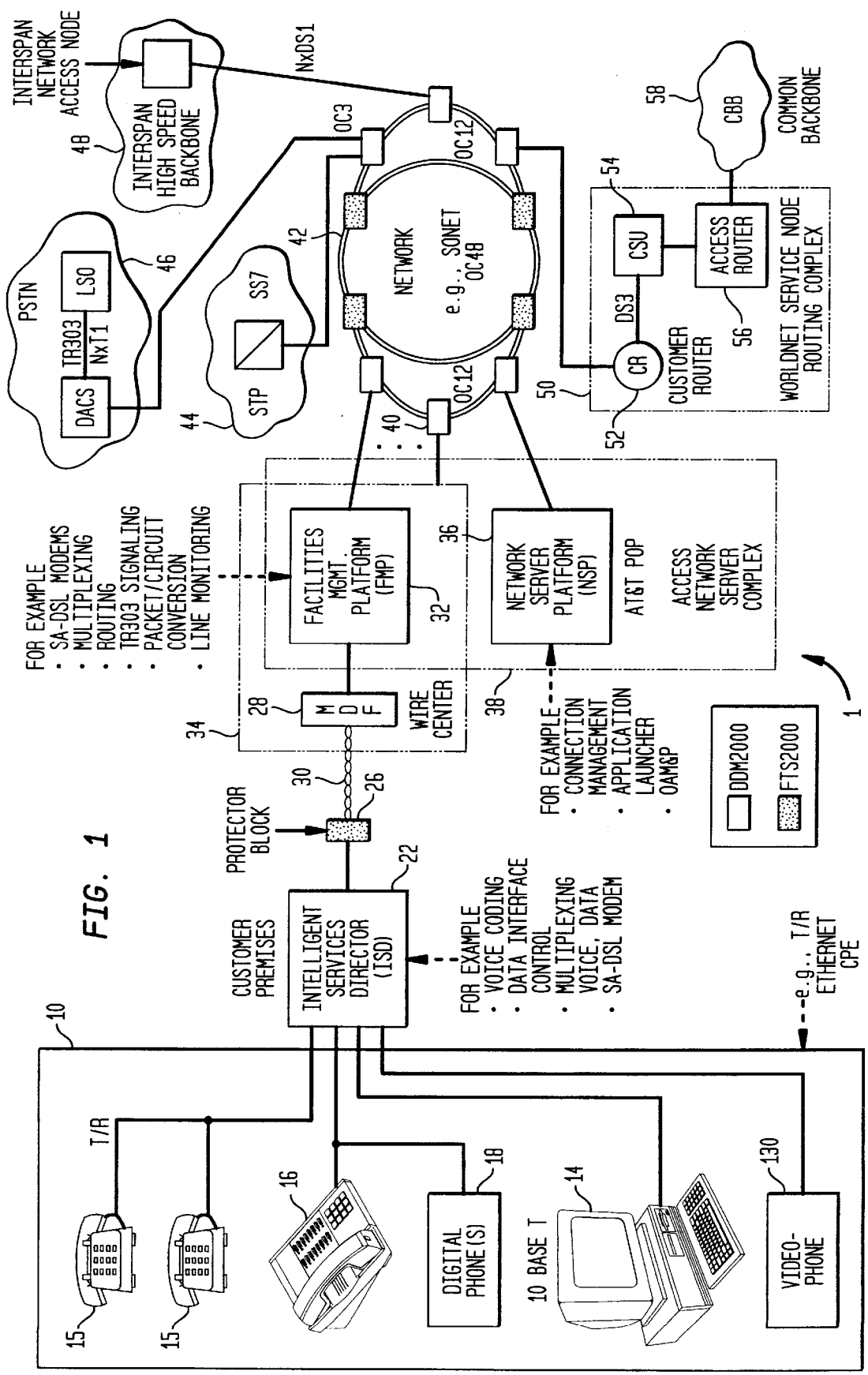
FIG. 1 illustrates an embodiment of a hybrid fiber twisted pair local loop architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply reloading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment. Additionally, the service provider may collect fees from advertisers to subsidize the cost of the equipment.

Figure 2:
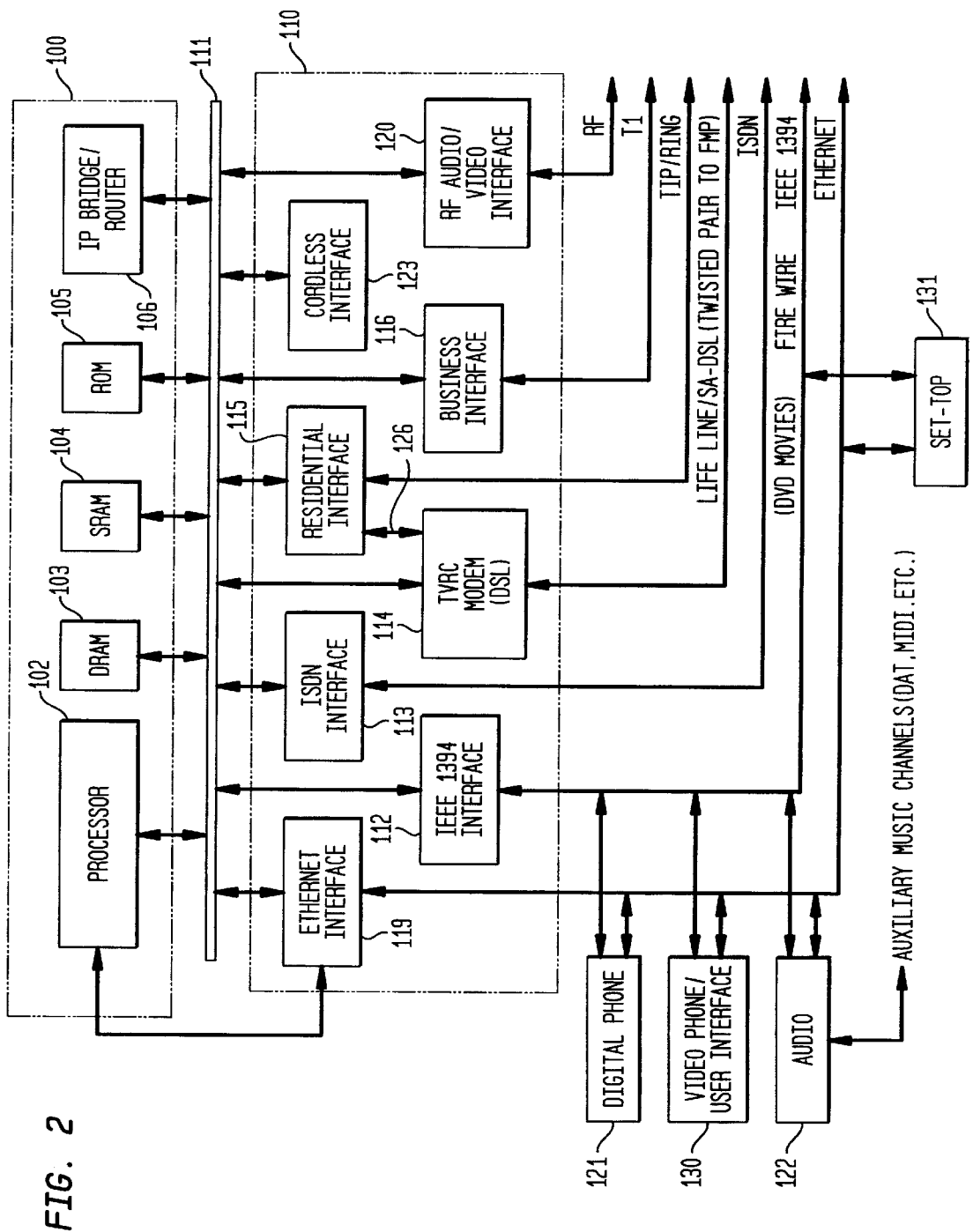
FIG. 2 is a block diagram of an embodiment of an intelligent services director consistent with the architecture shown in FIG. 1.

Referring to FIG. 2, the ISD 22 may connect with one or more of a variety of devices including analog and digital telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices maybe connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem. With the advent of low poer CMOS, it will be possible to power the ISD from the CO.

As shown in FIG. 2, in some embodiments the ISD 22 may include a controller 100 which may have any of a variety of elements such as a central processing unit 102, a DRAM 103, an SRAM 104, a ROM 105 and/or an internet protocol (FMP) bridge router 106 connecting the controller 100 to a system bus 111. The system bus 111 may be connected with a variety of network interface devices 110. The network interface devices 110 may be variously configured to include one or more of an integrated services digital network (ISDN) interface 113, an Ethernet interface 119 (e.g., for 28.8 kbs data, 56 kbs data, ISDN, 10 BaseT, 100 BaseT, etc.), an IEEE 1394 "fire wire" interface 112 (e.g., for a digital videodisc device (DVD)), a TVRC modem interface 114 (e.g., for a digital subscriber line (DSL)

modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 ME transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10 or CO. The lifeline 126 may be utilized to connect the ISD 22 to the local telecommunications companys central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a set top device 131.

In further embodiments, the ISD 22 may be configured as an IP proxy server such that each of the devices connected to the server utilizes transmission control protocol/internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/ movie in real time for immediate viewing and/or into storage for later viewing.

Figure 3B:
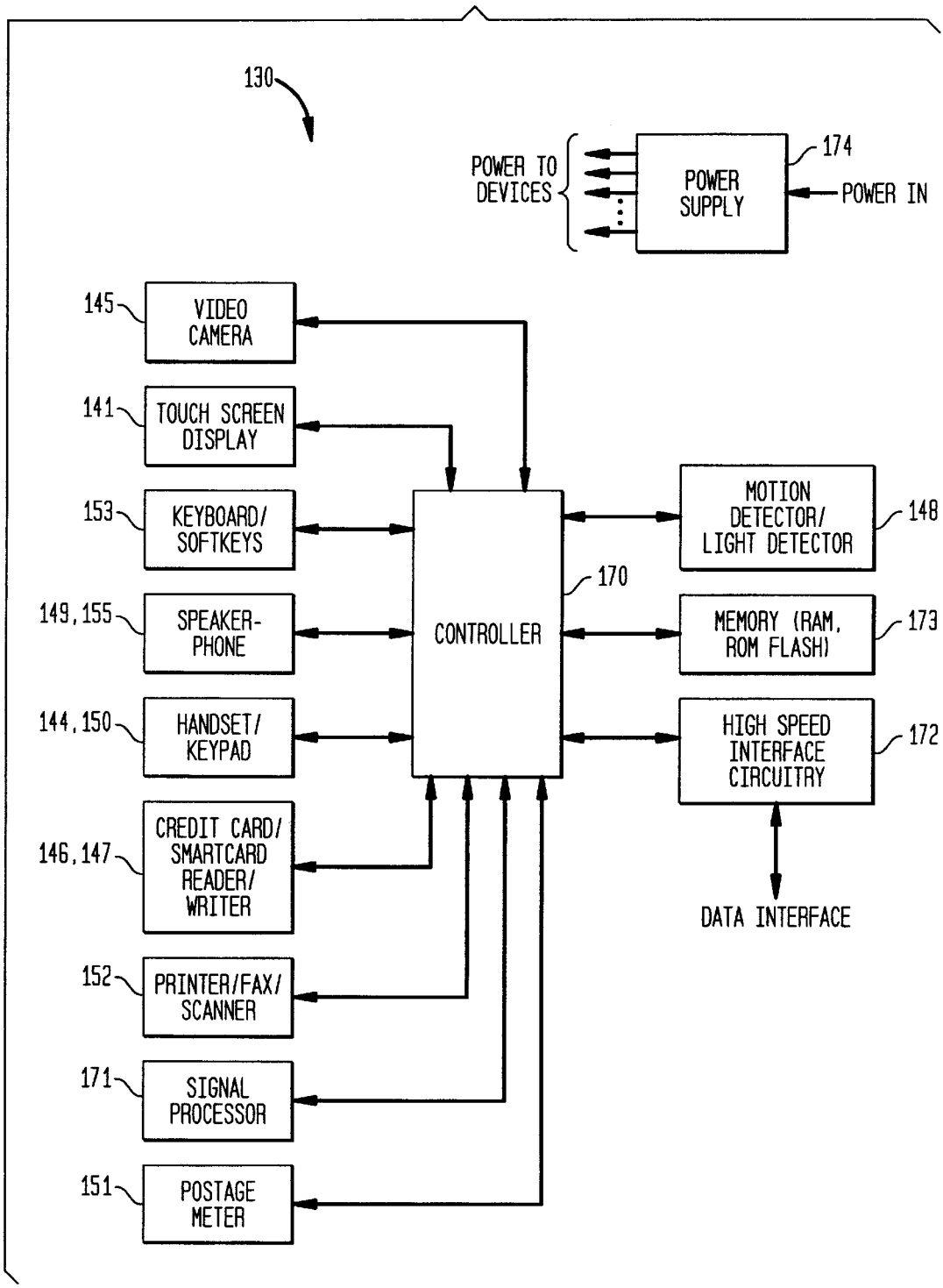

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
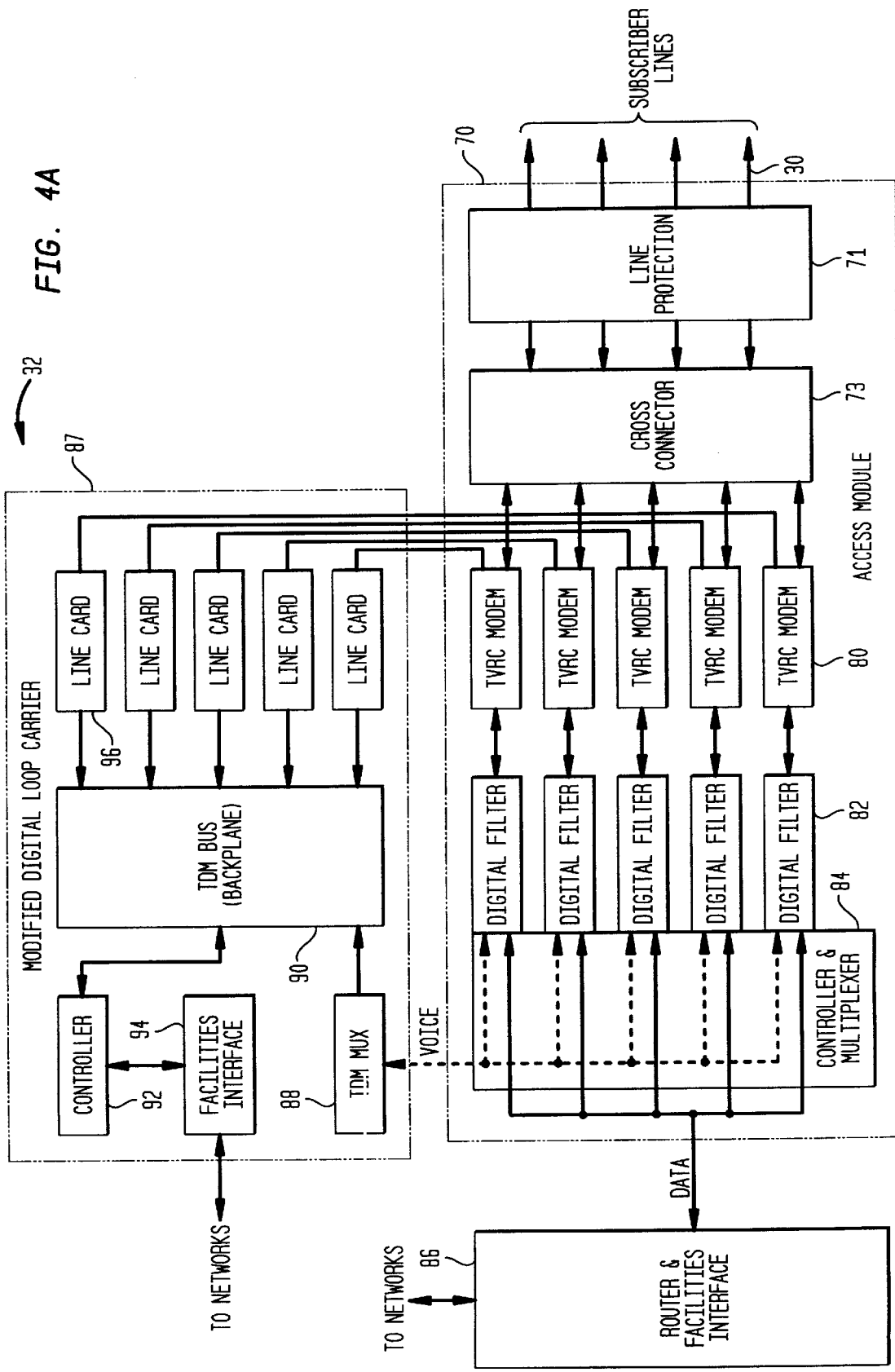
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor QMUX 88, a fDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the 1DM bus 90 and eventually through the controller 92 and the facilities interface 94 for transmission to one or more external networks.

Figure 4B:
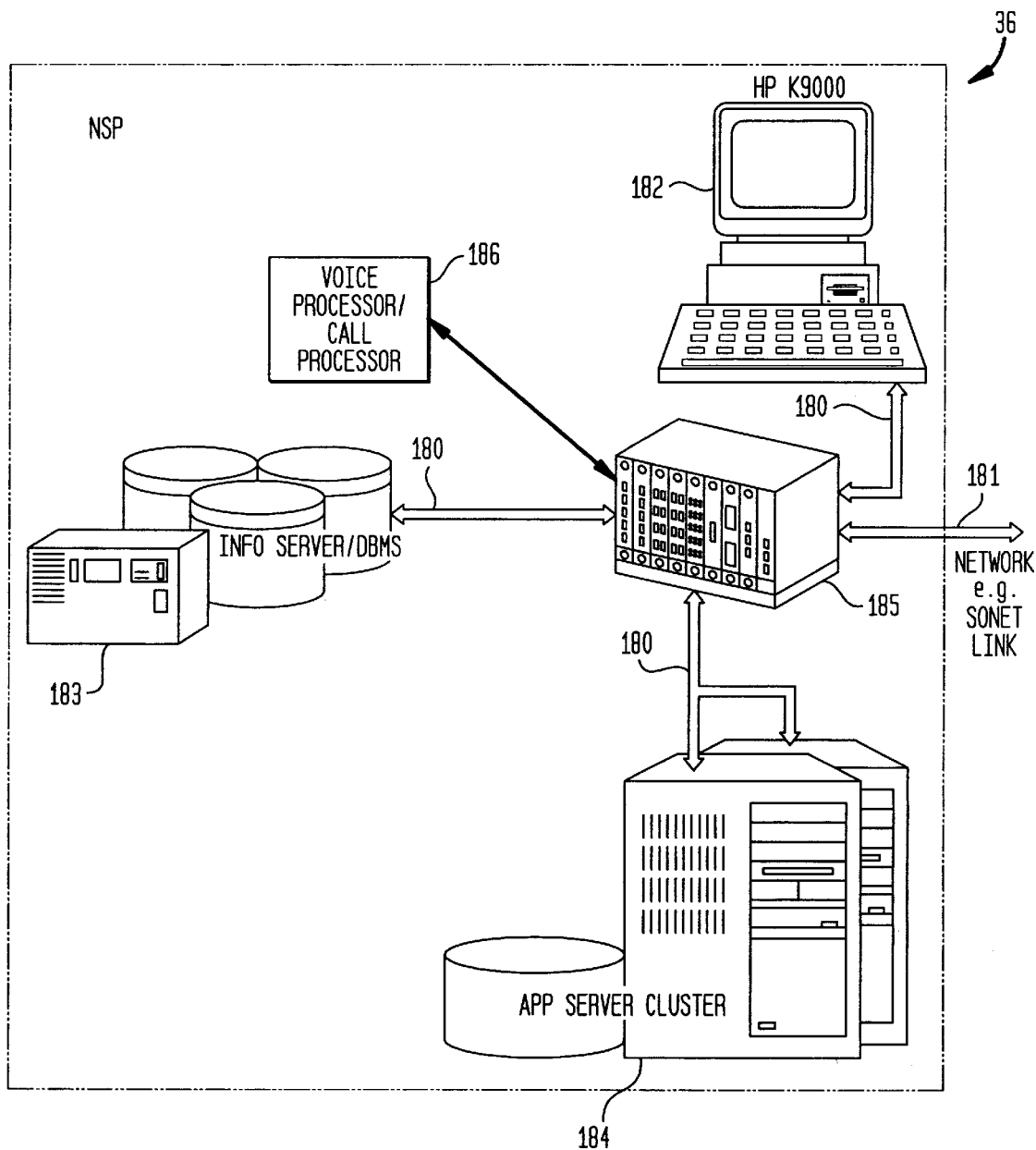
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

The NSP 36, ISD 32, and/or video phone 130 may host a multimedia announcement answering machine which may be either a standard format and/or customized by individual users. FIGS. 5–8 provide various examples of multimedia announcement messages which may appear on video phone enabled telephones.

Referring to FIG. 5, video phone users may record video greetings for their answering machines to a video enabled caller. For example, the announcement messages 300 may be variously configured to include one or more of the following either alone or in any combination: a video greeting 300 recorded via camera 145; a video greeting downloaded from a video playing device such as a digital video camera; a stock video greeting obtained from a CD (not shown), a stock video greetingfimage obtained from the NSP 36 via the ISD 22 and FMP 32 (e.g., a holiday or seasonal greeting—Christmas, Thanksgiving, winter, summer, fall, movie star greeting a well known movie star, etc.); a still image or photograph scanned in via scanner 152; an audio only greeting; stock greeting layouts obtained either locally (via a storage medium, RAM card inserted via smart reader 147, locally attached CD ROM (not shown)) and/or remotely from the NSP; greetings generated locally as discussed in the application entitled Video Phone Multimedia Announcement Message Toolkit incorporated by reference below; greetings which include one or more of the following control or hot buttons and/or announcements: video greeting 316 to answer the incoming call, leave voice mail 310 to allow an incoming caller to leave a voice mail message, leave video mail 311 to allow an incoming caller to leave a video mail message, leave E-mail 312 to allow an incoming caller to leave an E-mail message, please call 313 to allow a caller to simply push a button on the video phone to leave a stock message to the receiving party using either a caller ID number or a number entered by the calling party; will call again 314 to allow a caller to simply push a button on his or her video phone to leave a stock message identified using a caller ID and a name spoken and/or typed by the user; secondary user buttons 320, 321 to provide one touch direct access to an individual mail box and/or secondary greeting of another resident of the called location; and/or a plurality of alternate contact buttons 317 to provide direct access via pressing one of the buttons to alternate contact information for the called party such as an E-mail interface button 301, and/or a plurality of speed dial buttons for automatically dialing various devices such as a pager 302 (including sending of the calling parties number), cellular phone 303, work phone 304, vacation home 305, and/or facsimile machine 306; and/or a password protected access button 318 to provide the owner of the video phone access to various control features of the answering machine.

For example, FIG. 5 shows one exemplary embodiment of a announcement message 300 which may appear on the video phone of a calling party. The video greeting 316 may be a scanned in image of a person associated with the video phone (optionally touched-up), a video clip of the person associated with the video phone, and/or possibly a totally unrelated person picture and/or video clip. The particular arrangement and organization of the announcement message 300 may be user customizable. For example, FIG. 6 shows a second exemplary embodiment of an announcement message 300.

Figure 6:
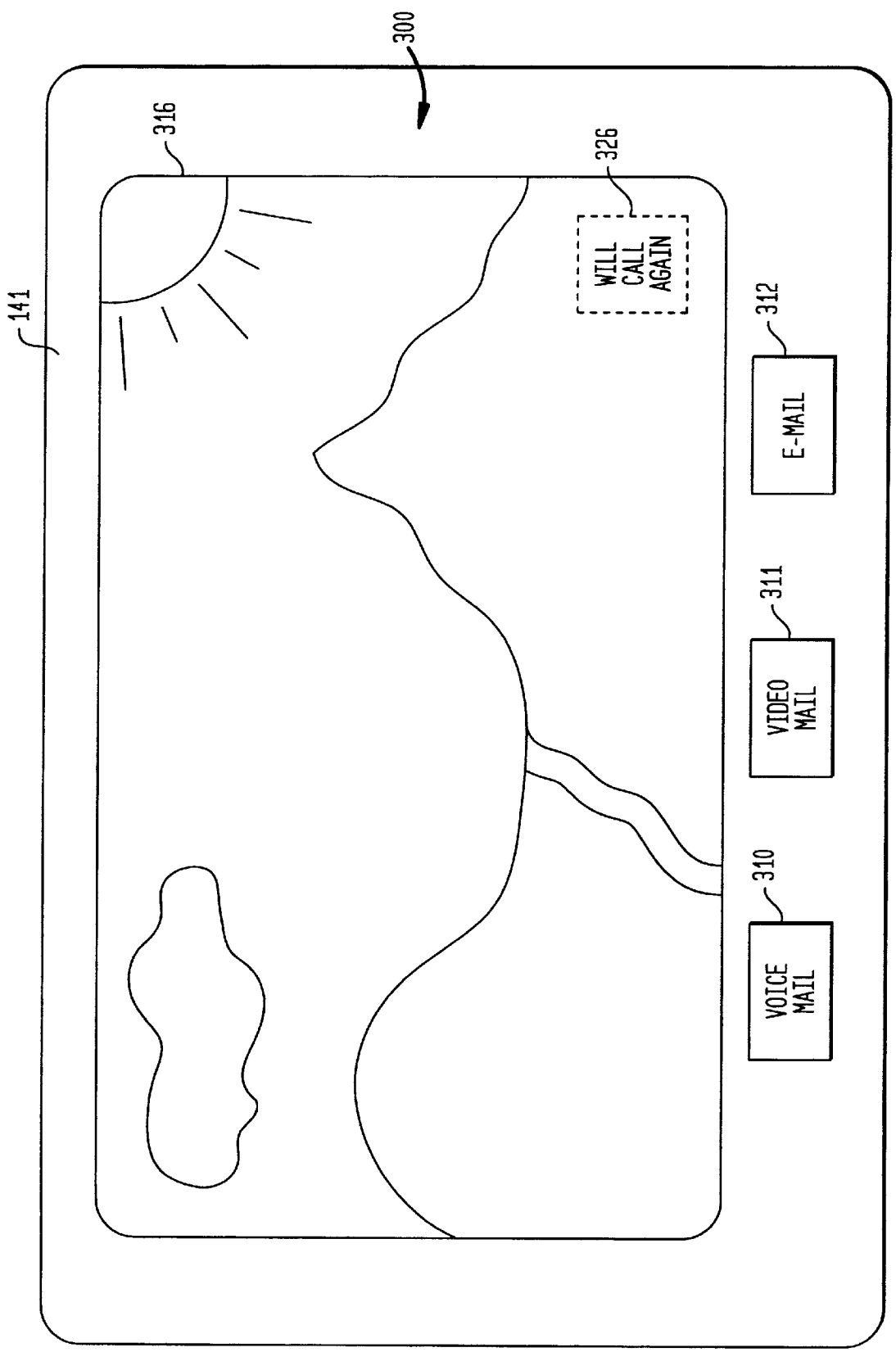

Referring to FIG. 6, is can be seen that the greeting 316 may be any suitable size. For example, the greeting 316 may form a background over either all or substantially all of the screen 141. The greeting 316 may have one or more keys 326 overlayed over the greeting and/or disposed about the boarder of the greeting 316.

Figure 7:
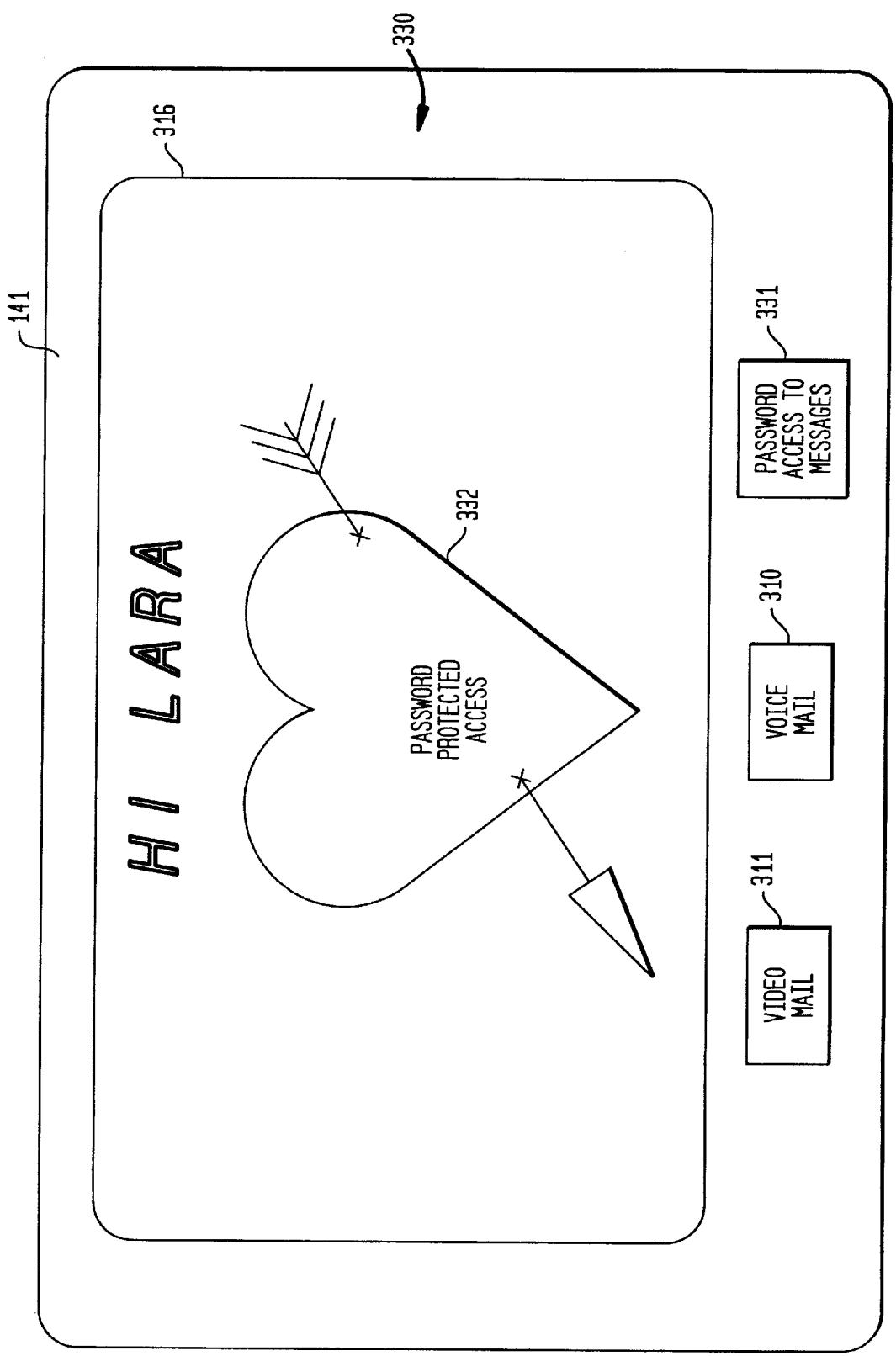

Referring to FIG. 7, the greeting may be customized for a particular caller ID. For example, where the calling location of the users girl friend is known, the user may customize his screen to play a special message to the calling party. Different screens may be shown to the called parties parents, friends, girl friend, siblings, boss, and people unknown to the called party. In the example illustrated in FIG. 7, the calling party is someone named LARA. In the exemplary embodiment shown in FIG. 7, the greeting 316 occupies substantially all of the video screen 141. Various items may be overlayed on the screen including the ability to leave video mail 311, voice mail 310, and/or enter password protected areas such as messages 331 and/or photos etc., 332. The password protected access nomenclature may or may not appear on the screen depending on the called parties preference. Where password protection access is used, the called party may give the calling party access to private numbers, pictures, video clips, and/or messages, etc.

Figure 8:
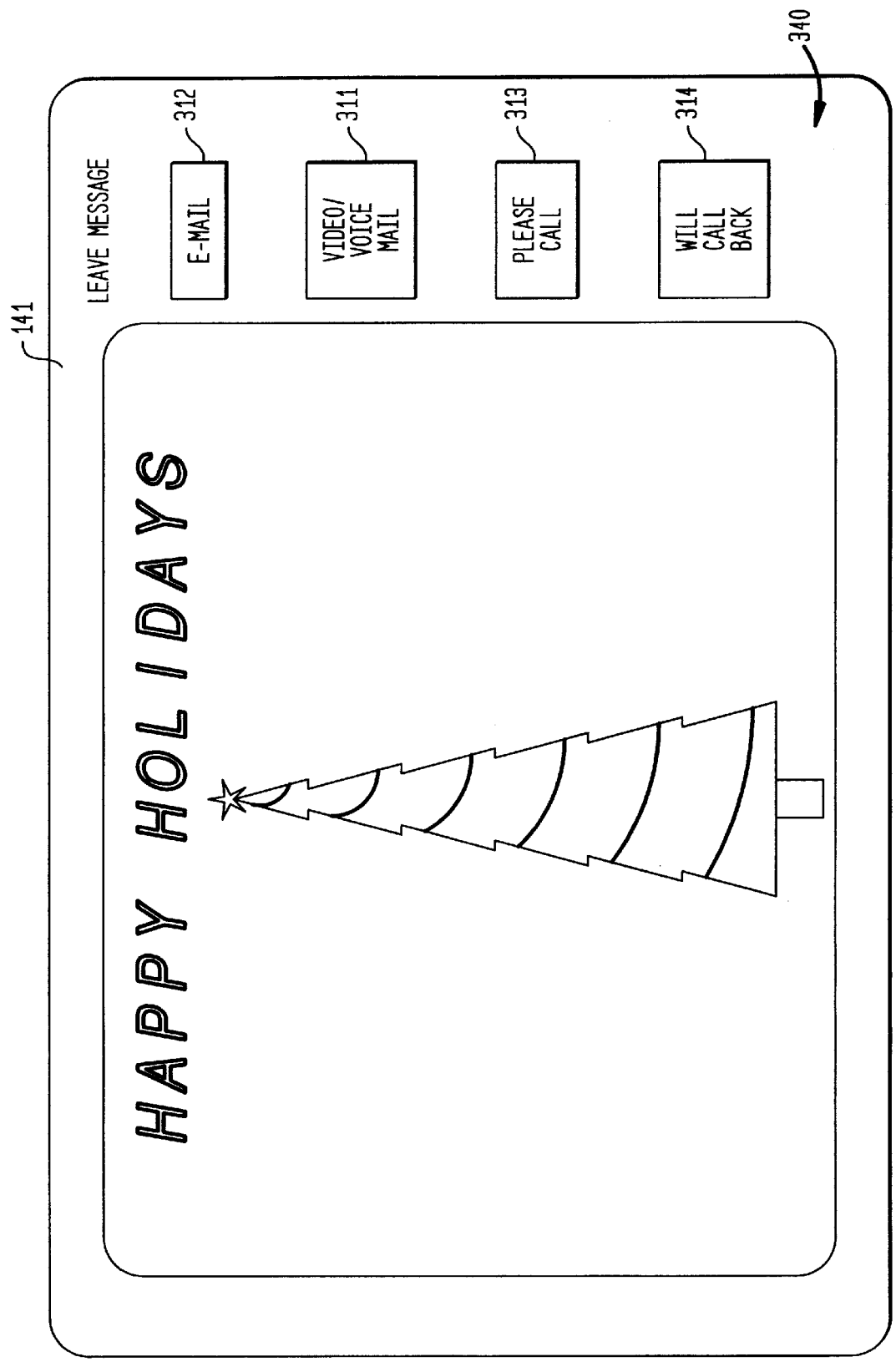
Figure 9:
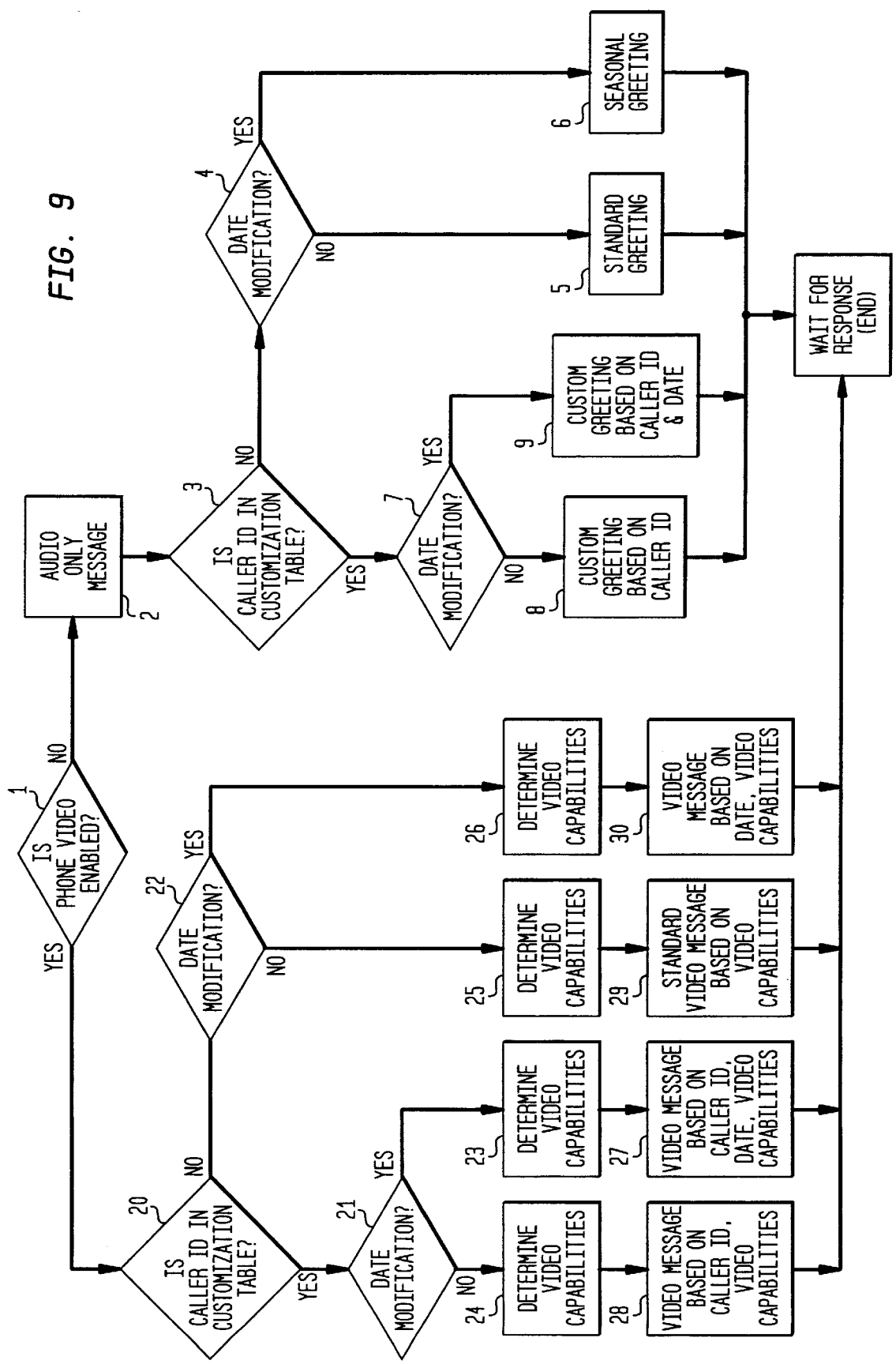
FIG. 9 is a flow diagram representing an exemplary processing method in accordance with an aspect of the invention.

A further exemplary embodiment is shown in FIG. 8. In this embodiment, the called party may use seasonal and/or special occasion greetings which are either programmed into the video phone at the time or pre-stored to prevent forgetting an occasion. For example, the called party can program his video phone to read an internal or remote clock (not shown) and obtain data about the current date and time. Further, in a programming screen, the called party may specify certain greetings to be displayed during certain times, during certain days, during certain ranges of days, and/or for certain caller Ids based on certain times, certain days, and/or certain ranges of days. For example, the embodiment illustrated in FIG. 8 shows a seasonal announcement message such as a Christmas tree as the video greeting 316. The seasonal announcement message may be programmed to appear during certain days such as between November 29 and December 31. Thereafter, a new-years greeting could be scheduled to appear during the first month of the year. Different seasonal greetings and/or random greetings selected from a NSP data base could be selected to be displayed on the screen. In this manner, more creative individuals could both customize their greeting with minimal effort and give the appearance of having a completely up-to-date greeting. As an example, where an individual knows that he or she goes home at 5:00 pm each day, the individual can leave after hours contact information and/or other customized announcement message which automatically appears between 5:00 pm and 8:00 am each day.

In addition to the above, the greeting may be customized for a combination of a particular caller ID and date. For example, a called party may set his office answering machine to detect his wife's caller ID and display a happy anniversary message when his wife called the office. Similarly, an individual may use a separate message when he is working at home than when he is in the office. Further, the video phone may be programmed to call an individual on a specified date and time to send a reminder message and/or anniversary greeting to that person.

In operation, the video phone 130 determines if the calling party is video phone enabled (step 1). If the calling party is not video phone enabled, just the audio track of the video greeting may be sent to the calling party. The control buttons on the of the announcement messages may also be converted to DTMF menu structures. For example, where the calling party (who is not video phone enabled) called a video phone with an announcement message as shown in FIG. 5, the video phone would give the calling party the option of leaving a message after the tone or pushing 1 to hear more options. The options would then be structured in a hierarchy with, for example, all of the alternate contact information listed under a first sub-menu tree under, for example, the number 5 (e.g., push 5 to obtain alternate contact numbers). Similary, the other buttons would be assigned various menu locations. For example, the main menu may have numbers 3 and 4 respectively assigned to leave messages for Irwin and/or Jeff The number 5 may be assigned to remote access controls 315, the number 6 to please call message 313, etc.

Returning to step 2, after a determination is made that the calling party is not video phone enabled, processing continues at step 3. In step 3, the caller ID of the calling party is obtained and compared against a database of caller Ids associated with customized announcement messages. The database may be stored either locally in the video phone or remotely at the NSP 36. Where the caller ID is not known, processing proceeds to step 4. At step 4, the date is checked to determine whether a standard greeting step 5 is given to the calling party or whether a time sensitive greeting (e.g., a seasonal greeting) step 6 is provided to the calling party.

Returning to step 3, where the calling party has an ID which matches a customized message indication stored in the database, the calling party receives a customized message. The customized message may also be modified based on a particular date step 7. For example, the customize greeting which is not date modified (step 8) may follow the audio track as outlined in FIG. 7 with appropriate menu choices, while the customized greeting which is date modified (Step 9) may have a customized greeting set to acknowledge an anniversary and/or birthday.

Where the calling parties video phone is determined to be video enabled (step 1), processing continues at step 20. The abilities of the calling party may be determined through a start-up protocol where the calling party and the call party exchange a series of message packets to establish a mutually acceptable communication rate (based, in part, on various considerations such as line conditions and the various capabilities of each phone), a remaining amount of memory for the called party's answering machine, whether the calling party has his camera enabled, and other compatibility standards such as the protocol used to reproduced the announcement messages at the called parties video phone. In one exemplary embodiment, html codes and/or a more efficient proprietary protocol geared to telephone networks may be utilized. Where a proprietary protocol is utilized, the proprietary protocol may have certain predefined buttons, greetings, and/or key and greeting locations in order to enable complex screens to be presented while using a minimum amount of bandwidth.

In step 20, if the caller ID is contained in a database of appropriate caller Ids, then processing proceeds to step 21. If not, processing proceeds to step 22. In step 21 and step 22, a determination is made whether the message is to be modified in accordance with the present date and/or time as determined from a local and/or remote clock in a similar fashion as in steps 4 and 7. In step the video capabilities of the calling party are determined and the announcement message is tailored to the particular capabilities of the calling party. For example, where the calling party is not a video phone but only a PC connected via a 28.8Kbps modem, the announcement messages may be cropped and/or the resolution reduced. In this manner, the amount of information provided to the calling party will not unnecessarily slow down the reception of the announcement messages. Video phone compatible software may be sold to non-video phone personal computer users such that anyone calling using a telephone equipped personal computer may have access to the video phone announcement messages. The same protocol established between two or more video phones may also be used between a video phone and a personal computer. Telecommunication standards for these devices can be set in international standards organizations to enable wide use of the video phone.

In step 27, a customized announcement message having an appropriate video resolution and/or size is displayed based on the caller ID number and date. In step 28, a customized video message having an appropriate video resolution and/or size is displayed to the calling party based on the caller ID of the calling party, e.g, as in FIG. 7. In step 29, a standard message having an appropriate video resolution and/or size is displayed to the calling party, e.g., as in FIG. 5. In step 30, a video message having an appropriate video resolution and/or size is displayed to a calling party based on the current date and/or time as in FIG. 8.

The above description has been written to reflect the fact that the announcement messages 300 and associated control processing were all performed locally on the local video phone 130. However, alternate configurations may have the processing and control for the announcement messages located at the ISD22, FMP 32, and/or the NSP 36. For example, where the call-set-up fails through the NSP 36, the NSP may select one of a plurality of pre-stored announcement messages to display to the incoming caller. In this way, the upstream bandwidth between the called party and calling party need not be utilized to transmit these messages. Accordingly, the announcement messages (either a system standard announcement and/or a customized announcement as described above) may be stored on the NSP and sent directly to the calling party. Thereafter, the called party is notified of a waiting answer which may also be stored either in the video phone 130, the ISD 22, the FMP 32, and/or the NSP 36.

In configuring each of the greetings, one or more customization bits may be enabled. For example, by selecting a certain bit, a seasonal greeting 340 may be applied as a background to the standard customized message shown in FIG. 5 and/or FIG. 7. Thus, the heart graphic of FIG. 7 may be over laid over a standard seasonal greeting background such as that shown in FIG. 8. Alternatively, where the bit is not set, the seasonal greeting will have no effect on the customized caller ID based greeting.

The following applications, filed concurrently herewith, are hereby incorporated by reference:
1. A Hybrid Fiber Twisted-pair Local Loop Network Service Architecture, U.S. application Ser. No. 09/001,360, filed Dec. 31, 1997;
2. Dynamic Bandwidth Allocation for use in the Hybrid Fiber Twisted-pair Local Loop Network Service Architecture, U.S. application Ser. No. 09/001,425, filed Dec. 31, 1997;
3. The VideoPhone U.S. application Ser. No. 09/001,905, filed Dec. 31, 1997;
4. VideoPhone Privacy Activator, U.S. application Ser. No. 09/001,909, filed Dec. 31, 1997;
5. VideoPhone Form Factor, U.S. application Ser. No. 09/001,583, filed Dec. 31, 1997;
6. VideoPhone Centrally Controlled User Interface With User Selectable Options, U.S. application Ser. No. 09/001,576, filed Dec. 31, 1997, now ABANDONED;
7. VideoPhone User Interface Having Multiple Menu Hierarchies, U.S. application Ser. No. 09/001,908, filed Dec. 31, 1997, now ABANDONED;
8. VideoPhone Blocker U.S. Pat. No. 5,949,474, issued on Sep. 7, 1999;
9. VideoPhone Inter-com For Extension Phones, U.S. application Ser. No. 09/001,358, filed Dec. 31, 1997;
10. Advertising Screen Saver, U.S. Pat. No. 6,084,583, issued on Jul. 4, 2000;
11. Information Display for Visual Communication Device, U.S. Pat. No. 6,222,520, issued on Apr. 24, 2001;
12. VideoPhone Multimedia Announcement Answering Machine, U.S. application Ser. No. 09/001,911, filed Dec. 31, 1997;
13. VideoPhone Multimedia Announcement Message Toolkit, U.S. application Ser. No. 09/001,345, filed Dec. 31, 1997;
14. VideoPhone Multimedia Video Message Reception, U.S. application Ser. No. 09/001,362, filed Dec. 31, 1997, now ABANDONED;
15. VideoPhone Interactive Corporate Menu Answering Machine Announcement, U.S. Pat. No. 6,226,362, issued on May 1, 2001;
16. VideoPhone Multimedia Interactive On-Hold Information Menus, U.S. Pat. No. 6,020,916, issued on Feb. 1, 2000;
17. VideoPhone Advertisement When Calling Video Non-enabled VideoPhone Users, U.S. application Ser. No. 09/001,361, filed Dec. 31, 1997;
18. Motion Detection Advertising, U.S. application Ser. No. 09/001,355, filed Dec. 31, 1997;
19. Method and system for supporting interactive commercials displayed on a display device using a telephone network, U.S. Pat. No. 6,178,446, issued on Jan. 23, 2001;
20. Video communication device providing in-home Catalogue Services, U.S. Pat. No. 5,970,473, issued on Oct. 19, 1999;
21. A Multifunction interface Facility Connecting Wideband Multiple Access Subscriber Loops With Various Networks, U.S. application Ser. No. 09/001,422, filed Dec. 31, 1997;
22. Life Line Support for Multiple Service Access on Single Twisted-pair, U.S. application Ser. No. 09/001,343, filed Dec. 31, 1997;
23. A Network Server Platform (NSP) For a Hybrid Fiber Twisted-pair (HFTP) Local Loop Network Service Architecture, U.S. Pat. No. 6,229,810, issued on May 8, 2001;
24. A Communication Server Apparatus For Interactive Commercial Service, U.S. application Ser. No. 09/001,344, filed Dec. 31, 1997;
25. NSP Based Multicast Digital Program Delivery Services, U.S. application Ser. No. 09/001,580, filed Dec. 31, 1997;
26. NSP for Internet, JAVA Server and Video Application Server, U.S. Pat. No. 6,044,403, issued on Mar. 28, 2000;
27. NSP WAN Interconnectivity Services for Corporate Telecommuting, U.S. application Ser. No. 09/001,540, filed Dec. 31, 1997;
28. NSP Telephone Directory White-Yellow Page Services, U.S. Pat. No. 6,052,439, issued Apr. 18, 2000;
29. NSP Integrated Billing System For NSP services and Telephone services, U.S. application Ser. No. 09/001,359, filed Dec. 31, 1997;
30. Network Server Platform/Facility Management Platform Caching Server, U.S. application Ser. No. 09/001,419, filed Dec. 31, 1997;
31. An Integrated Services Director (ISD) Overall Architecture, U.S. application Ser. No. 09/001,417, filed Dec. 31, 1997;
32. ISD/VideoPhone (Customer Premises) Local House Network, U.S. application Ser. No. 09/001,418, filed Dec. 31, 1997, now ABANDONED;
33. ISD Wireless Network, U.S. application Ser. No. 09/001,363, filed Dec. 31, 1997;
34. ISD Controlled Set-Top Box, U.S. application Ser. No. 09/001,424, filed Dec. 31, 1997;

35. Integrated Remote Control and Phone, U.S. application Ser. No. 09/001,423, filed Dec. 31, 1997;
36. Integrated Remote Control and Phone User Interface, U.S. application Ser. No. 09/001,420, filed Dec. 31, 1997;
37. Integrated Remote Control and Phone Form Factor, U.S. Pat. No. 6,292,210, issued Sep. 18, 2001;
38. VideoPhone Mail Machine, U.S. Provisional Application Ser. No. 60/070,104, filed Dec. 31, 1997, now U.S. application Ser. No. 09/218,171 filed Dec. 22, 1998;
39. Restaurant Ordering Via VideoPhone, U.S. Provisional Application Ser. No. 60/070,121, filed Dec. 31, 1997, now U.S. application Ser. No. 09/218,171 filed Dec. 22, 1998;
40. Ticket Ordering Via VideoPhone, U.S. Provisional Application Ser. No. 60/070,103, filed Dec. 31, 1997, now U.S. application Ser. No. 09/218,171 filed Dec. 22, 1998;
41. Multi-Channel Parallel/Serial Concatenated Convolutional Codes And Trellis Coded Modulation Encoder/Decoder, U.S. Pat. No. 6,088,387, issued on Jul. 11, 2000;
42. Spread Spectrum Bit Allocation Algorithm, U.S. application Ser. No. 09/001,842, filed Dec. 31, 1997;
43. Digital Channelizer With Arbitrary Output Frequency, U.S. application Ser. No. 09/001,581, filed Dec. 31, 1997;
44. Method And Apparatus For Allocating Data Via Discrete Multiple Tones, U.S. Pat. No. 6,134,274, issued on Oct. 17, 2000;
45. Method And Apparatus For Reducing Near-End Cross Talk In Discrete Multi-Tone Modulators/Demodulators, U.S. Pat. No. 6,144,695, issued Nov. 7, 2000.

In addition, the following two patent applications are hereby incorporated by reference:
1. U.S. Pat. No. 6,061,326 issued on May 9, 2000, entitled Wideband Communication System for the Home, to Robert R. Miller, II and Jesse E. Russell, and
2. U.S. Pat. No. 6,111,895 issued on Aug. 29, 2000, entitled Wide Band Transmission Through Wire, to Robert R Miller, II, Jesse E. Russell and Richard R. Shively.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A video answering apparatus including a processor for outputting a video announcement message to a calling party, wherein the video announcement message is automatically formatted based on pre-stored criteria, and a transmission rate of a communication link between said video answering apparatus and a device used by the calling party to place a call.

2. The video answering apparatus of claim 1, wherein the pre-stored criteria is a caller ID.

3. The video answering apparatus of claim 1, wherein the video announcement message is automatically cropped based on pre-stored criteria, the transmission rate of the communication link between said video answering apparatus and the device used by the calling party to place the call.

4. The video answering apparatus of claim 1, wherein the resolution of the video announcement message is automatically reduced based on pre-stored criteria, the transmission rate of the communication link between said video answering apparatus and the device used by the calling party to place the call.

5. A video answering apparatus including a processor for automatically formatting a video announcement message having a plurality of graphical control buttons into an audio message having a DTMF menu structure in accordance with equipment capabilities of a calling party.

6. The video answering apparatus of claim 5, wherein said processor automatically crops the video announcement message in accordance with equipment capabilities of the calling party.

7. The video answering apparatus of claim 5, wherein said processor automatically reduces the resolution of the video announcement message in accordance with equipment capabilities of the calling party.

8. A video answering apparatus, including a processor for modifying a resolution of a video announcement message responsive to caller ID, a current date, and received messages indicative of equipment capabilities of a calling party.

9. A video answering apparatus, including a processor for modifying a size of a video announcement message responsive to caller ID, a current date, and received messages indicative of equipment capabilities of a calling party.

10. A system comprising a remote network server located remotely from a premises of a called party, including:
    a memory storing a plurality of video announcement messages for the called party prior to a calling party placing a call to the called party; and
    a processor configured to electronically select one of the video announcement messages, responsive to a request from a called party answering machine, format the selected video announcement based on transmission capabilities of the calling party and transmit the selected video announcement directly from the remote network server to the calling party when the calling party places the call.

11. The system of claim 10, wherein said processor crops the video announcement message in accordance with the transmission capabilities of the calling party.

12. The system of claim 10, wherein said processor reduces the resolution of the video announcement message in accordance with the transmission capabilities of the calling party.

13. A system method of transmitting a video announcement message, said method comprising the steps of:
    storing a plurality of video announcement messages in a memory;
    selecting a video announcement message in response to a request from a called party, wherein the request includes calling party information;
    formatting the selected video announcement message based on the calling party information; and
    transmitting the selected and formatted video announcement message to the called party for playback to the calling party.

14. The method of claim 13, wherein formatting the selected video announcement message based on the calling party information includes cropping the video announcement message based on the transmitting capabilities of the calling party.

15. The method of claim 13, wherein formatting the selected video announcement message based on the calling party information includes reducing the resolution of the video announcement message based on the transmitting capabilities of the calling party.

16. A video-phone method of transmitting a video announcement message, said method comprising the steps of:
    receiving a call from a calling party;
    transmitting a request to a network for a video announcement message, wherein the request includes calling party information;

receiving a selected video announcement message from the network; and transmitting the selected video announcement message to the calling party.

17. The method of claim 16, wherein the selected video announcement message is formatted based on the calling party information.

18. The method of claim 17, wherein formatting the selected announcement message includes cropping the video announcement message based on the transmitting capabilities of the calling party.

19. The method of claim 17, wherein formatting the selected announcement message includes reducing the resolution of the video announcement message based on the transmitting capabilities of the calling party.

* * * * *